(12) United States Patent
Benattar et al.

(10) Patent No.: US 10,945,080 B2
(45) Date of Patent: Mar. 9, 2021

(54) AUDIO ANALYSIS AND PROCESSING SYSTEM

(71) Applicant: STAGES PCS, LLC, Ewing, NJ (US)

(72) Inventors: Benjamin D. Benattar, Cranbury, NJ (US); Alexander Khusidman, Jenkintown, PA (US); Christopher A. Magner, Lancaster, PA (US); Oya Gumustop Yuksel, Lower Gwynedd, PA (US)

(73) Assignee: STAGES LLC

( * ) Notice: Subject to any disclaimer, the term of this patent is extended or adjusted under 35 U.S.C. 154(b) by 130 days.

(21) Appl. No.: 15/355,822

(22) Filed: Nov. 18, 2016

(65) Prior Publication Data

US 2018/0146306 A1    May 24, 2018

(51) Int. Cl.
*H04R 25/00*    (2006.01)
*G06F 3/16*    (2006.01)
*H04W 4/80*    (2018.01)

(52) U.S. Cl.
CPC ........... *H04R 25/407* (2013.01); *G06F 3/165* (2013.01); *H04R 25/43* (2013.01); *H04R 25/554* (2013.01); *H04W 4/80* (2018.02); *H04R 2225/43* (2013.01)

(58) Field of Classification Search
CPC .... H04R 25/407; H04R 25/43; H04R 25/505; H04R 25/554; H04R 2225/43;
(Continued)

(56) References Cited

U.S. PATENT DOCUMENTS 3,806,919 A    4/1974 Comey
4,776,044 A    10/1988 Makins
(Continued)

FOREIGN PATENT DOCUMENTS

AU    2002300314 B2    2/2004
AU    2003236382 B2    3/2005
(Continued)

OTHER PUBLICATIONS

WASSP, WMB-3230, Operator manual, Version V1.1a, Jun. 2013, pp. 1-67.
(Continued)

*Primary Examiner* — Jason R Kurr
(74) *Attorney, Agent, or Firm* — Mark E. Ungerman; Ungerman IP PLLC

(57) ABSTRACT

An audio analysis and processing system with a processor configured with an audio array input thread connected to a plurality of audio input channels each corresponding to an audio input sensor. An audio input sensor may be positionally related to a position of other audio input sensors and a source input thread may be configured to be connected to a microphone audio input channel. An audio output thread may be configured to be connected to a speaker output channel and a beamformer thread may be responsive to the audio array input thread. A beam analysis and selection thread may be connected to an output of the beamformer thread and a mixer thread may have a first input connected to an output of the source input thread and a second input connected to an output of the beam analysis and selection thread and may have an output connected to the audio output thread. The audio input channel may be connected to the personal communication device. The microphone audio input channel may be connected to the personal communication device. The processor may include a line output (Continued)

thread configured to connect to an audio output channel. An audio information interface may be provided to connect signals representing audio to the processor.

12 Claims, 6 Drawing Sheets

(58) Field of Classification Search
CPC .. H04R 2430/23; H04R 2201/40; H04W 4/80; G06F 3/165; G10K 11/17827
See application file for complete search history.

(56) References Cited

U.S. PATENT DOCUMENTS

| | | | |
|---|---|---|---|
| 5,432,858 A | 7/1995 | Clair et al. |
| 5,581,620 A | 12/1996 | Brandstein et al. |
| 5,619,582 A | 4/1997 | Oltman et al. |
| 5,638,343 A | 6/1997 | Ticknor |
| 5,668,884 A | 9/1997 | Clair et al. |
| 5,737,431 A | 4/1998 | Brandstein et al. |
| 5,764,778 A | 6/1998 | Zurek |
| 5,778,082 A | 7/1998 | Chu et al. |
| 5,793,875 A | 8/1998 | Lehr et al. |
| 5,796,351 A | 8/1998 | Yabuki |
| 5,822,440 A | 10/1998 | Oltman et al. |
| 6,462,808 B2 | 10/2002 | Paritsky et al. |
| RE38,405 E | 1/2004 | Clair et al. |
| 6,816,437 B1 | 11/2004 | Teller et al. |
| 6,959,075 B2 | 10/2005 | Cutaia et al. |
| 7,110,552 B1 | 9/2006 | Saliterman |
| D552,077 S | 10/2007 | Brunner et al. |
| 7,349,547 B1 | 3/2008 | Isvan |
| 7,395,181 B2 | 7/2008 | Foxlin |
| 7,415,117 B2 | 8/2008 | Tashev et al. |
| 7,430,300 B2 | 9/2008 | Vosburgh et al. |
| 7,475,434 B2 | 1/2009 | Ambuske et al. |
| 7,492,907 B2 | 2/2009 | Klayman et al. |
| 7,583,808 B2 | 9/2009 | Smaragdis et al. |
| 7,613,305 B2 | 11/2009 | Vieilledent et al. |
| 7,620,409 B2 | 11/2009 | Budampati et al. |
| 7,817,805 B1 | 10/2010 | Griffin |
| 7,848,512 B2 | 12/2010 | Eldracher |
| 7,970,150 B2 | 6/2011 | Oxford |
| D641,725 S | 7/2011 | Chong et al. |
| 7,995,770 B1 | 8/2011 | Simon |
| 8,064,607 B2 | 11/2011 | Monceaux et al. |
| 8,150,054 B2 | 4/2012 | Andrea et al. |
| 8,155,346 B2 | 4/2012 | Yoshizawa et al. |
| 8,194,873 B2 | 6/2012 | Pan et al. |
| 8,229,740 B2 | 7/2012 | Nordholm et al. |
| 8,290,174 B1 | 10/2012 | Simon |
| 8,379,874 B1 | 2/2013 | Simon |
| 8,483,396 B2 | 7/2013 | Amadu et al. |
| 8,515,751 B2 | 8/2013 | Zanolin et al. |
| 8,521,316 B2 | 8/2013 | Louboutin |
| 8,542,843 B2 | 9/2013 | Andrea et al. |
| 8,566,887 B2 | 10/2013 | Hasek et al. |
| 8,577,053 B1 | 11/2013 | Simon |
| 8,612,187 B2 | 12/2013 | Amadu |
| 8,718,930 B2 | 5/2014 | Tachibana et al. |
| 8,768,496 B2 | 7/2014 | Katz et al. |
| 8,779,895 B2 | 7/2014 | Holm |
| 8,861,756 B2 | 10/2014 | Zhu et al. |
| 8,866,495 B2 | 10/2014 | Baarman et al. |
| 8,873,767 B2 | 10/2014 | Regler |
| 8,917,506 B2 | 12/2014 | Diebel et al. |
| 8,934,635 B2 | 1/2015 | Esnault et al. |
| 8,949,958 B1 | 2/2015 | Dixon |
| 8,981,994 B2 | 3/2015 | Sorenson |
| 9,069,058 B2 | 6/2015 | Booij et al. |
| 9,087,506 B1 | 7/2015 | Kraft et al. |
| 9,111,529 B2 | 8/2015 | Amadu et al. |
| 9,112,464 B2 | 8/2015 | Amadu et al. |
| 9,113,264 B2 | 8/2015 | Frater |
| 9,131,308 B2 | 9/2015 | Kraft et al. |
| 9,143,595 B1 | 9/2015 | Dowd |
| 9,226,088 B2 | 12/2015 | Pandey et al. |
| 9,264,806 B2 | 2/2016 | Hyun et al. |
| 9,392,381 B1 | 7/2016 | Park et al. |
| 9,432,769 B1 | 8/2016 | Sundaram et al. |
| 9,510,090 B2 | 11/2016 | Lissek et al. |
| 9,591,404 B1 | 3/2017 | Chhetri |
| 9,826,297 B2 | 11/2017 | Benzaia et al. |
| 2002/0122137 A1 | 9/2002 | Chen et al. |
| 2002/0188364 A1 | 12/2002 | Ota et al. |
| 2003/0142587 A1 | 7/2003 | Zeitzew |
| 2003/0161485 A1* | 8/2003 | Smith .......... G01V 1/006 381/92 |
| 2004/0114777 A1 | 6/2004 | Aubauer et al. |
| 2005/0004985 A1 | 1/2005 | Stochosky |
| 2005/0117771 A1 | 6/2005 | Vosburgh et al. |
| 2006/0013409 A1 | 1/2006 | Desloge |
| 2006/0056638 A1 | 3/2006 | Schobben |
| 2006/0095516 A1 | 5/2006 | Wijeratne |
| 2006/0098809 A1 | 5/2006 | Nongpiur et al. |
| 2007/0021093 A1 | 1/2007 | Chu |
| 2007/0030986 A1 | 2/2007 | McArthur et al. |
| 2008/0164942 A1 | 7/2008 | Takeuchi et al. |
| 2008/0174665 A1 | 7/2008 | Enstad et al. |
| 2008/0199025 A1 | 8/2008 | Amada |
| 2008/0316863 A1 | 12/2008 | Walley et al. |
| 2009/0010443 A1 | 1/2009 | Ahnert et al. |
| 2009/0316529 A1 | 12/2009 | Huuskonen et al. |
| 2010/0034396 A1 | 2/2010 | Wollmershauser et al. |
| 2010/0048134 A1 | 2/2010 | McCarthy et al. |
| 2010/0128892 A1 | 5/2010 | Chen et al. |
| 2010/0141153 A1 | 6/2010 | Recker et al. |
| 2010/0205222 A1 | 8/2010 | Gajdos et al. |
| 2010/0239105 A1 | 9/2010 | Pan |
| 2010/0284525 A1 | 11/2010 | Sander et al. |
| 2010/0290636 A1 | 11/2010 | Mao et al. |
| 2011/0025912 A1 | 2/2011 | Regler |
| 2011/0081024 A1 | 4/2011 | Soulodre |
| 2011/0103607 A1 | 5/2011 | Bychkov et al. |
| 2011/0127623 A1 | 6/2011 | Fueldner et al. |
| 2011/0194710 A1 | 8/2011 | Prest et al. |
| 2012/0020485 A1 | 1/2012 | Visser et al. |
| 2012/0020502 A1 | 1/2012 | Adams |
| 2012/0070015 A1 | 3/2012 | Oh et al. |
| 2012/0087507 A1 | 4/2012 | Meyer |
| 2012/0128160 A1 | 5/2012 | Kim et al. |
| 2012/0128175 A1 | 5/2012 | Visser et al. |
| 2012/0177219 A1 | 7/2012 | Mullen et al. |
| 2012/0182429 A1 | 7/2012 | Forutanpour et al. |
| 2012/0183163 A1 | 7/2012 | Apfel |
| 2012/0215519 A1 | 8/2012 | Park et al. |
| 2012/0224715 A1* | 9/2012 | Kikkeri ........... H04R 3/005 381/92 |
| 2012/0259628 A1 | 10/2012 | Siotis |
| 2012/0270231 A1 | 10/2012 | Smith et al. |
| 2012/0271640 A1 | 10/2012 | Basir |
| 2012/0288126 A1 | 11/2012 | Karkkainen et al. |
| 2013/0030789 A1 | 1/2013 | Dalce |
| 2013/0034241 A1 | 2/2013 | Pandey et al. |
| 2013/0035777 A1 | 2/2013 | Niemisto et al. |
| 2013/0082875 A1 | 4/2013 | Sorensen |
| 2013/0101136 A1 | 4/2013 | McElveen |
| 2013/0121505 A1 | 5/2013 | Duraiswami et al. |
| 2013/0148814 A1 | 6/2013 | Karthik et al. |
| 2013/0305297 A1 | 11/2013 | Jabara et al. |
| 2013/0322214 A1 | 12/2013 | Neukirch et al. |
| 2014/0036127 A1 | 2/2014 | Pong et al. |
| 2014/0044275 A1 | 2/2014 | Goldstein et al. |
| 2014/0093093 A1 | 4/2014 | Dusan et al. |
| 2014/0157325 A1 | 6/2014 | Jabara et al. |
| 2014/0184386 A1 | 7/2014 | Regler et al. |
| 2014/0191798 A1 | 7/2014 | Lozhkin |
| 2014/0200054 A1 | 7/2014 | Fraden |
| 2014/0233181 A1 | 8/2014 | Harms et al. |
| 2014/0270200 A1* | 9/2014 | Usher .......... H04R 1/1041 381/57 |
| 2014/0270217 A1 | 9/2014 | Ivanov et al. |
| 2014/0270231 A1 | 9/2014 | Dusan et al. |
| 2014/0270248 A1 | 9/2014 | Ivanov et al. |

(56) References Cited

U.S. PATENT DOCUMENTS

| | | |
|---|---|---|
| 2014/0270254 A1 | 9/2014 | Oishi et al. |
| 2014/0270321 A1 | 9/2014 | Fullam |
| 2014/0278394 A1 | 9/2014 | Bastyr et al. |
| 2014/0287806 A1 | 9/2014 | Balachandreswaran |
| 2014/0301568 A1 | 10/2014 | Amadu et al. |
| 2014/0307877 A1 | 10/2014 | Sumioka et al. |
| 2014/0341411 A1 | 11/2014 | Mohindra et al. |
| 2014/0350926 A1 | 11/2014 | Schuster et al. |
| 2014/0359444 A1 | 12/2014 | Greenberg-Sanders et al. |
| 2015/0054913 A1 | 2/2015 | Annau et al. |
| 2015/0055937 A1 | 2/2015 | Hoff et al. |
| 2015/0058102 A1 | 2/2015 | Christensen et al. |
| 2015/0095026 A1 | 4/2015 | Bisani et al. |
| 2015/0161980 A1 | 6/2015 | Alderson et al. |
| 2015/0189621 A1 | 7/2015 | Bekiares et al. |
| 2015/0193195 A1 | 7/2015 | Lin et al. |
| 2015/0201271 A1 | 7/2015 | Diethorn et al. |
| 2015/0206524 A1 | 7/2015 | Kraft et al. |
| 2015/0208156 A1 | 7/2015 | Virolainen |
| 2015/0208170 A1 | 7/2015 | Kraft et al. |
| 2015/0215701 A1* | 7/2015 | Usher .................. H04R 1/1041 381/71.6 |
| 2015/0234156 A1 | 8/2015 | Rondinelli et al. |
| 2015/0242519 A1 | 8/2015 | Alsina et al. |
| 2015/0309151 A1 | 10/2015 | Shibata et al. |
| 2015/0312671 A1 | 10/2015 | Wiggins et al. |
| 2015/0312677 A1 | 10/2015 | Kraft et al. |
| 2015/0348580 A1 | 12/2015 | Hoff et al. |
| 2015/0350768 A1 | 12/2015 | Terpstra |
| 2015/0355880 A1 | 12/2015 | Kraft et al. |
| 2015/0365759 A1 | 12/2015 | Dimitriadis et al. |
| 2015/0373474 A1 | 12/2015 | Kraft et al. |
| 2015/0382096 A1 | 12/2015 | Lamar et al. |
| 2015/0382106 A1 | 12/2015 | Kraft et al. |
| 2016/0014166 A1 | 1/2016 | Warrick et al. |
| 2016/0055861 A1 | 2/2016 | Kraft et al. |
| 2016/0057526 A1 | 2/2016 | Jaffe et al. |
| 2016/0111088 A1 | 4/2016 | Park |
| 2016/0295322 A1 | 10/2016 | Orescanin |
| 2016/0300584 A1* | 10/2016 | Pandey .................. H04R 3/005 |
| 2017/0032629 A1 | 2/2017 | Fernandes |
| 2017/0064427 A1 | 3/2017 | Rich et al. |
| 2017/0064478 A1 | 3/2017 | Lai et al. |
| 2017/0134849 A1 | 5/2017 | Pandey et al. |
| 2017/0236507 A1 | 8/2017 | Benattar et al. |
| 2017/0295446 A1 | 10/2017 | Shivappa |
| 2018/0046431 A1 | 2/2018 | Thagadur Shivappa et al. |
| 2018/0160211 A1* | 6/2018 | Kirsch ................ H04R 1/1041 |
| 2018/0184226 A1 | 6/2018 | Giannuzzi |
| 2018/0206054 A1 | 7/2018 | Laitinen et al. |
| 2018/0270571 A1 | 9/2018 | Di Censo et al. |

FOREIGN PATENT DOCUMENTS

| | | |
|---|---|---|
| CN | 103229160 A | 7/2013 |
| DE | 102004025533 A1 | 12/2005 |
| EP | 0653144 B1 | 12/1998 |
| JP | 2009188641 A | 8/2009 |
| WO | 2005032209 A2 | 4/2005 |
| WO | 2012048299 A1 | 4/2012 |
| WO | WO2012048299 A1 | 4/2012 |
| WO | 2014096861 A2 | 6/2014 |

OTHER PUBLICATIONS

Albing, Brad, Noise-Reducing Headphones Hide Analog Heart, Jan. 24, 2013, http://www.planetanalog.com/author.asp?section.sub.—id=385&doc.sub.—id=-558728, USA.

AustriaMicrosystems AG, AS3421/22 Low Power Ambient Noise-Cancelling Speaker Driver DataSheet, 61 pages, 1997-2013, Austria.

AustriaMicrosystems AG-AMS AG, AS3501 AS3502 Low Power Ambient Noise-Cancelling Speaker Driver DataSheet, 46 pages, 1997-2009, Austria.

Baldwin, Richard G., Adaptive Noise Cancellation Using Java, Java Programing Notes #2360, Apr. 18, 2006, http://www.developer.com/java/other/article.php/3599661/Adaptive-Noise-Ca- ncellation-Using-Java.htm, USA.

Chowdhry, Amit, 26 Best Noise Cancelling Headphones, Pulse2.0 Technology News Since 2006, Nov. 28, 2012, http://pulse2.com/2012/11/28/best-noise-canceling-headphones/, USA.

CNET TV, Monoprice's Noise Cancelling Headphone tries to silence critics, http://scienceheap.com/?rvq, https://www.youtube.com/watch?v=h8.sub.—PDtXQu58#t=89, Apr. 10, 2013, USA.

Conexant, Conexant AudioSmart Voice & Speech Processing White Paper, Feb. 12, 2014, pp. 1-19.

Elliott, S.J., Nelson, P.A., Active Noise Control—Low-frequency techniques for suppressing acoustic noise leap forward with signal processing, IEEE Signal Processing Magazine, Oct. 1993, 24 pages, USA.

FMA Solutions, Inc., Best Noise Canceling Earphones, Westone Noise Canceling Earphones, 2014, earphonesolutions.com/coofsoiseaan.html, Orlando, FL, USA.

FrankFSP, ConcertTronix! The Revolutionary New Way to Attend, Listen and Record Live Concerts with Your Mobile Device!, Sep. 12, 2012, USA.

Geronazzo, Michelle; Bedin, Alberto; Brayda, Luca; Campus, Claudio; Avanzini, Federico. Interactive spatial sonification for non-visual exploration of virtual maps, Int. J. Human-Computer Studies, 85(2016) 4-15, 2015 Elsevier Ltd.

Haynes, Toby, A Primer on Digital Beamforming, Mar. 26, 1988, www.spectrumsignal.com, 15 pages, British Columbia, Canada.

Jezierny, Michael; Keller, Brenton; Lee, Kyung Yul, Digital Active Noise Cancelling Headphones, School of Engineering and Applied Science, Electrical and Systems Engineering Department, Washington University in St. Louis, May 2010, 25 pages, USA.

Jiang, Wentao, "Sound of silence": a secure indoor wireless ultrasonic communication system, School of Engineering—Electrical & Electronic Engineering, UCC, 2014, http://publish.ucc.ie/boolean/pdf/2014/00/09-jiang-2014-00-en.pdf, retrieved Nov. 24, 2015.

Kendall, Gary S., A 3-D Sound Primer: Directional Hearing and Stereo Reproduction, Computer Music Journal, vol. 19, No. 4 (Winter, 1995), pp. 23-46.

Kuo, Sen M. and Morgan, Dennis R., Active Noise Control: A Tutorial Review, Proceedings of the IEEE, vol. 87, No. 6, Jun. 1999, pp. 943-973, USA.

Kuo, Sen M.; Panahi, K., Horner, T., Nadeski, Mark; Chyan, Jason, Design of Active Noise Control Systems with the TMS320 Family Application Report, Texas Instruments Digital Signal Processing Solutions, 1996, 171 pages, USA.

Lavalle, S.M.; Yershova, A.; Katseve, M.; Antonov, M. (2014). Head Tracking for the Oculus Rift, Proceedings of the IEEE International Conference on Robotics and Automation, p. 187-194.

Lu, Yan-Chen; Cooke, Martin, Motion strategies for binaural localisation of speech sources in azimuth and distance by artificial listeners, Speech Comm. (2010) , Jun. 12, 2010, ScienceDirect.

Mannion, Patrick. Teardown: Analog Rules Over Digital in Noise-Canceling Headphones, EDN Network, Jan. 11, 2013, 3 pages, USA.

Maxim, Audio Design Guide, 12th Edition, Dec. 2009, 20 pages, USA.

MINIDSP, Digital Crossover Basics, 2009-2014, 4 pages, USA.

Parra, Lucas; Fancourt, Craig, An Adaptive Beamforming Perspective on Convolutive Blind Source Separation, Sarnoff Corporation, Noise Reduction in Speech Applications, Ed. G. Davis, CRC Press, 2002, Princeton, NJ, pp. 1-18.

Priyantha, N.B.; Chakraborty, A.; Balakrishan, H., The Cricket Location-Support System, 2000, MIT Laboratory for Computer Science, Cambridge, Massachusetts, U.S.

Repetto, Stafania and Trucco, Andrea, Andrea, Designing Superdirective Microphone Arrays with a Frequency Invariant Beam Pattern, IEEE Sensors Journal, vol. 6, No. 3, Jun. 2006, pp. 737-747, Genova, Italy.

(56) References Cited

OTHER PUBLICATIONS

Ruckus Wireless, Inc., Best Practice Design Guide: Deploying Very High Density Wi-Fi—Design and Configuration Guide for Stadiums, 2012, http://c541678.r78.cf2.rackcdn.com/appnotes/bpg-highdensity.pdf, 2012, USA.
Singh, Aarti, Adaptive Noise Cancellation, Dept. of Electronics & Communication, Netaji Subhas Institute of Technology, 2001, 52 pages, India.
STMICROELECTRICS, STA311B Multichannel digital audio processor with FFX Datasheet, Oct. 2013, 102 pages, USA.
STMICROELECTRONICS, STA308A Multi-channel digital audio processor with DDX Datasheet, Jul. 2007, USA.
Zaunschirm, Markus and Zotter, Franz, Measurement-Based Modal Beamforming Using Planar Circular Microphone Arrays, Proc. of the EAA Joint Symposium on Auralization and Ambisonics, Apr. 3-5, 2014, pp. 75-80, Berlin, Germany.
Andrea Electronics Corporation, Digital Super Directional Array, DSDA Far-Field Microphone Technology, 2 pages, Melville, NY, USA.
Dualta, Currie, Shedding Some Light on Voice Authentication, SANS Institute InfoSec Reading Room, 2003, 17 pages, USA.
Head-related transfer function. Retrieved Sep. 28, 2016, from https://en.wikipedia.org/wiki/Head-related_transfer_function.
Kuo, S.M., Panahi, I., Chung, K.M., Horner, T., Nadeski, M., Chyan, J., Design of Active Noise Control Systems with the TMS320 Family Application Report, Texas Instruments Digital Signal Processing Solutions, 1996, 171 pages, USA.
miniDSP Ltd., Digital Crossover Basics, www.minidsp.com/, 2009-2014, 4 pages, Hong Kong.

\* cited by examiner

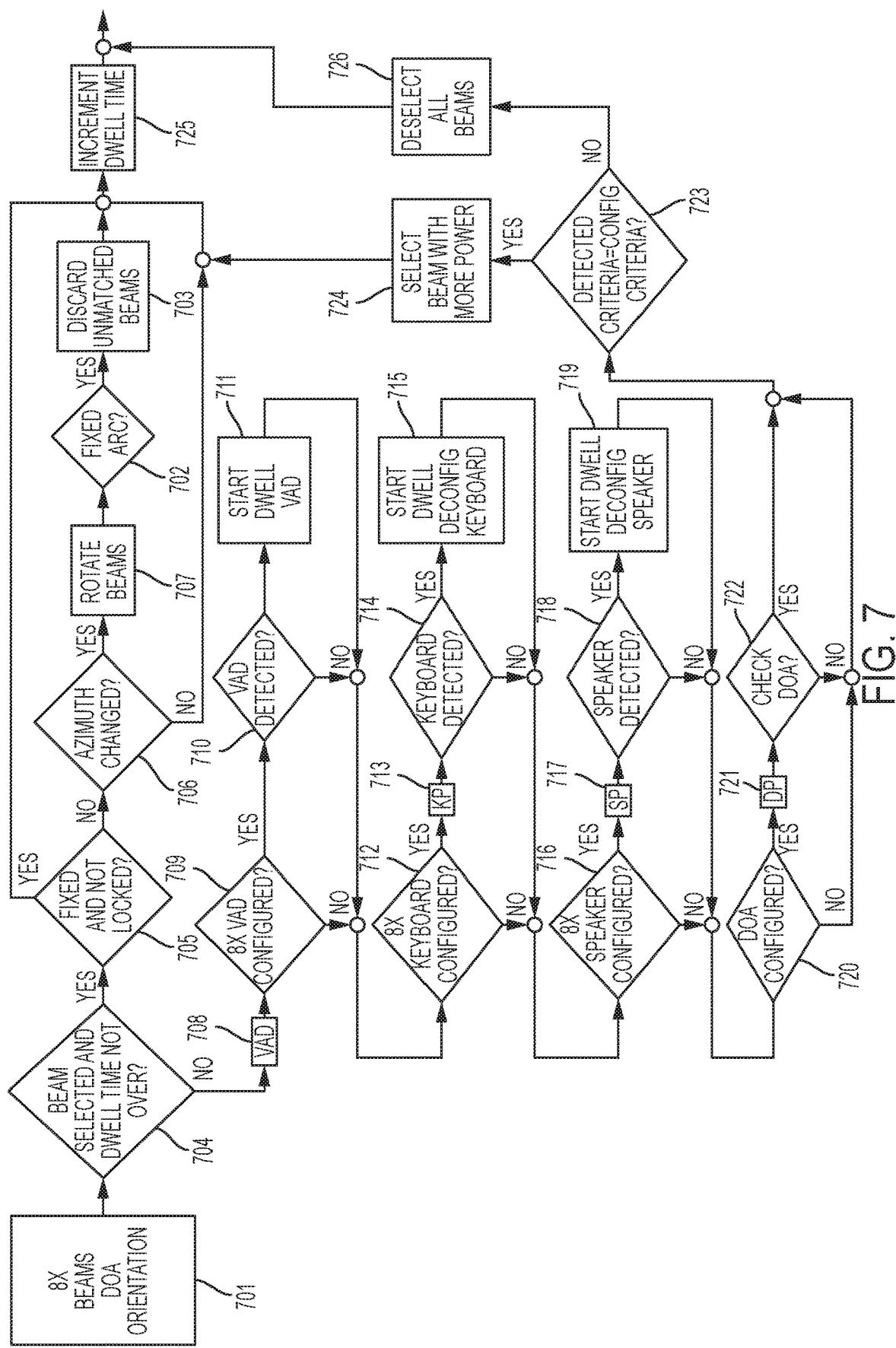

AUDIO ANALYSIS AND PROCESSING SYSTEM

CROSS-REFERENCE TO RELATED APPLICATIONS

The subject matter of this application relates to the disclosed subject matter of WO 2016/090342, which claims priority to US 2016/0163303; US 2016/0162254; US 2016/0165344; US 2016/0165339; US 2016/0161588; US 2016/0165340; US 2016/0161589; US 2016/0165341; US 2016/0164936; US 2016/0161595; US 2016/0165690; US 2016/0165338; US 2016/0161594; US 2016/0165350; US 2016/0165342; and US 2016/0192066, all of which are expressly incorporated by reference herein.

BACKGROUND OF THE INVENTION

1. Field of the Invention

The invention relates to an audio processing system and particularly a real-time processing system allowing processing of ambient and supplemental audio content according to desired specifications.

2. Description of the Related Technology

WO 2016/090342 A2, published Jun. 9, 2016, the disclosure of which is expressly incorporated herein and which was made by the inventor of subject matter described herein, shows an adaptive audio spatialization system having an audio sensor array rigidly mounted to a personal speaker.

It is known to use microphone arrays and beamforming technology in order to locate and isolate an audio source. Personal audio is typically delivered to a user by a personal speaker(s) such as headphones or earphones. Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

A sensitive transducer element of a microphone is called its element or capsule. Except in thermophone based microphones, sound is first converted to mechanical motion [by] a diaphragm, the motion of which is then converted to an electrical signal. A complete microphone also includes a housing, some means of bringing the signal from the element to other equipment, and often an electronic circuit to adapt the output of the capsule to the equipment being driven. A wireless microphone contains a radio transmitter.

The MEMS (MicroElectrical-Mechanical System) microphone is also called a microphone chip or silicon microphone. A pressure-sensitive diaphragm is etched directly into a silicon wafer by MEMS processing techniques, and is usually accompanied with integrated preamplifier. Most MEMS microphones are variants of the condenser microphone design. Digital MEMS microphones have built in analog-to-digital converter (ADC) circuits on the same CMOS chip making the chip a digital microphone and so more readily integrated with modern digital products. Major manufacturers producing MEMS silicon microphones are Wolfson Microelectronics (WM7xxx), Analog Devices, Akustica (AKU200x), Infineon (SMM310 product), Knowles Electronics, Memstech (MSMx), NXP Semiconductors, Sonion MEMS, Vesper, AAC Acoustic Technologies, and Omron.

A microphone's directionality or polar pattern indicates how sensitive it is to sounds arriving at different angles about its central axis. The polar pattern represents the locus of points that produce the same signal level output in the microphone if a given sound pressure level (SPL) is generated from that point. How the physical body of the microphone is oriented relative to the diagrams depends on the microphone design. Large-membrane microphones are often known as "side fire" or "side address" on the basis of the sideward orientation of their directionality. Small diaphragm microphones are commonly known as "end fire" or "top/end address" on the basis of the orientation of their directionality.

Some microphone designs combine several principles in creating the desired polar pattern. This ranges from shielding (meaning diffraction/dissipation/absorption) by the housing itself to electronically combining dual membranes.

An omni-directional (or non-directional) microphone's response is generally considered to be a perfect sphere in three dimensions. In the real world, this is not the case. As with directional microphones, the polar pattern for an "omni-directional" microphone is a function of frequency. The body of the microphone is not infinitely small and, as a consequence, it tends to get in its own way with respect to sounds arriving from the rear, causing a slight flattening of the polar response. This flattening increases as the diameter of the microphone (assuming it's cylindrical) reaches the wavelength of the frequency in question.

A unidirectional microphone is sensitive to sounds from only one direction.

A noise-canceling microphone is a highly directional design intended for noisy environments. One such use is in aircraft cockpits where they are normally installed as boom microphones on headsets. Another use is in live event support on loud concert stages for vocalists involved with live performances. Many noise-canceling microphones combine signals received from two diaphragms that are in opposite electrical polarity or are processed electronically. In dual diaphragm designs, the main diaphragm is mounted closest to the intended source and the second is positioned farther away from the source so that it can pick up environmental sounds to be subtracted from the main diaphragm's signal. After the two signals have been combined, sounds other than the intended source are greatly reduced, substantially increasing intelligibility. Other noise-canceling designs use one diaphragm that is affected by ports open to the sides and rear of the microphone.

Sensitivity indicates how well the microphone converts acoustic pressure to output voltage. A high sensitivity microphone creates more voltage and so needs less amplification at the mixer or recording device. This is a practical concern but is not directly an indication of the microphone's quality, and in fact the term sensitivity is something of a misnomer, "transduction gain" being perhaps more meaningful, (or just "output level") because true sensitivity is generally set by the noise floor, and too much "sensitivity" in terms of output level compromises the clipping level.

A microphone array is any number of microphones operating in tandem. Microphone arrays may be used in systems for extracting voice input from ambient noise (notably telephones, speech recognition systems, hearing aids), surround sound and related technologies, binaural recording, locating objects by sound: acoustic source localization, e.g., military use to locate the source(s) of artillery fire, aircraft location and tracking.

Typically, an array is made up of omni-directional microphones, directional microphones, or a mix of omni-directional and directional microphones distributed about the perimeter of a space, linked to a computer that records and interprets the results into a coherent form. Arrays may also have one or more microphones in an interior area encompassed by the perimeter. Arrays may also be formed using numbers of very closely spaced microphones. Given a fixed physical relationship in space between the different individual microphone transducer array elements, simultaneous DSP (digital signal processor) processing of the signals from each of the individual microphone array elements can create one or more "virtual" microphones.

Beamforming or spatial filtering is a signal processing technique used in sensor arrays for directional signal transmission or reception. This is achieved by combining elements in a phased array in such a way that signals at particular angles experience constructive interference while others experience destructive interference. A phased array is an array of antennas, microphones, or other sensors in which the relative phases of respective signals are set in such a way that the effective radiation pattern is reinforced in a desired direction and suppressed in undesired directions. The phase relationship may be adjusted for beam steering. Beamforming can be used at both the transmitting and receiving ends in order to achieve spatial selectivity. The improvement compared with omni-directional reception/transmission is known as the receive/transmit gain (or loss).

Adaptive beamforming is used to detect and estimate a signal-of-interest at the output of a sensor array by means of optimal (e.g., least-squares) spatial filtering and interference rejection.

To change the directionality of the array when transmitting, a beamformer controls the phase and relative amplitude of the signal at each transmitter, in order to create a pattern of constructive and destructive interference in the wavefront. When receiving, information from different sensors is combined in a way where the expected pattern of radiation is preferentially observed.

With narrow-band systems the time delay is equivalent to a "phase shift", so in the case of a sensor array, each sensor output is shifted a slightly different amount. This is called a phased array. A narrow band system, typical of radars or wide microphone arrays, is one where the bandwidth is only a small fraction of the center frequency. With wide band systems this approximation no longer holds, which is typical in sonars.

In the receive beamformer the signal from each sensor may be amplified by a different "weight." Different weighting patterns (e.g., Dolph-Chebyshev) can be used to achieve the desired sensitivity patterns. A main lobe is produced together with nulls and sidelobes. As well as controlling the main lobe width (the beam) and the sidelobe levels, the position of a null can be controlled. This is useful to ignore noise or jammers in one particular direction, while listening for events in other directions. A similar result can be obtained on transmission.

Beamforming techniques can be broadly divided into two categories: i) conventional (fixed or switched beam) beamformers; and ii) adaptive beamformers or phased array, which typically operate in a desired signal maximization mode or an interference signal minimization or cancellation mode Conventional beamformers use a fixed set of weightings and time-delays (or phasings) to combine the signals from the sensors in the array, primarily using only information about the location of the sensors in space and the wave directions of interest. In contrast, adaptive beamforming techniques generally combine this information with properties of the signals actually received by the array, typically to improve rejection of unwanted signals from other directions. This process may be carried out in either the time or the frequency domain.

As the name indicates, an adaptive beamformer is able to automatically adapt its response to different situations. Some criterion has to be set up to allow the adaption to proceed such as minimizing the total noise output. Because of the variation of noise with frequency, in wide band systems it may be desirable to carry out the process in the frequency domain.

Beamforming can be computationally intensive.

Beamforming can be used to try to extract sound sources in a room, such as multiple speakers in the cocktail party problem. This requires the locations of the speakers to be known in advance, for example by using the time of arrival from the sources to mics in the array, and inferring the locations from the distances.

A Primer on Digital Beamforming by Toby Haynes, Mar. 26, 1998 http://www.spectrumsignal.com/publications/beamform_primer.pdf describes beam forming technology.

According to U.S. Pat. No. 5,581,620, the disclosure of which is incorporated by reference herein, many communication systems, such as radar systems, sonar systems and microphone arrays, use beamforming to enhance the reception of signals. In contrast to conventional communication systems that do not discriminate between signals based on the position of the signal source, beamforming systems are characterized by the capability of enhancing the reception of signals generated from sources at specific locations relative to the system.

Generally, beamforming systems include an array of spatially distributed sensor elements, such as antennas, sonar phones or microphones, and a data processing system for combining signals detected by the array. The data processor combines the signals to enhance the reception of signals from sources located at select locations relative to the sensor elements. Essentially, the data processor "aims" the sensor array in the direction of the signal source. For example, a linear microphone array uses two or more microphones to pick up the voice of a talker. Because one microphone is closer to the talker than the other microphone, there is a slight time delay between the two microphones. The data processor adds a time delay to the nearest microphone to coordinate these two microphones. By compensating for this time delay, the beamforming system enhances the reception of signals from the direction of the talker, and essentially aims the microphones at the talker.

A beamforming apparatus may connect to an array of sensors, e.g. microphones that can detect signals generated from a signal source, such as the voice of a talker. The sensors can be spatially distributed in a linear, a two-dimensional array or a three-dimensional array, with a uniform or non-uniform spacing between sensors. A linear array is useful for an application where the sensor array is mounted on a wall or a podium talker is then free to move about a half-plane with an edge defined by the location of the array. Each sensor detects the voice audio signals of the talker and generates electrical response signals that represent these audio signals. An adaptive beamforming apparatus provides a signal processor that can dynamically determine the relative time delay between each of the audio signals detected by the sensors. Further, a signal processor may include a phase alignment element that uses the time delays to align the frequency components of the audio signals. The signal processor has a summation element that adds together the aligned audio signals to increase the quality of the desired audio source while simultaneously attenuating sources having different delays relative to the sensor array. Because the relative time delays for a signal relate to the position of the signal source relative to the sensor array, the beamforming apparatus provides, in one aspect, a system that "aims" the sensor array at the talker to enhance the reception of signals generated at the location of the talker and to diminish the energy of signals generated at locations different from that of the desired talker's location. The practical application of a linear array is limited to situations which are either in a half plane or where knowledge of the direction to the source in not critical. The addition of a third sensor that is not co-linear with the first two sensors is sufficient to define a planar direction, also known as azimuth. Three sensors do not provide sufficient information to determine elevation of a signal source. At least a fourth sensor, not co-planar with the first three sensors is required to obtain sufficient information to determine a location in a three dimensional space.

Although these systems work well if the position of the signal source is precisely known, the effectiveness of these systems drops off dramatically and computational resources required increases dramatically with slight errors in the estimated a priori information. For instance, in some systems with source-location schemes, it has been shown that the data processor must know the location of the source within a few centimeters to enhance the reception of signals. Therefore, these systems require precise knowledge of the position of the source, and precise knowledge of the position of the sensors. As a consequence, these systems require both that the sensor elements in the array have a known and static spatial distribution and that the signal source remains stationary relative to the sensor array. Furthermore, these beamforming systems require a first step for determining the talker position and a second step for aiming the sensor array based on the expected position of the talker.

A change in the position and orientation of the sensor can result in the aforementioned dramatic effects even if the talker is not moving due to the change in relative position and orientation due to movement of the arrays. Knowledge of any change in the location and orientation of the array can compensate for the increase in computational resources and decrease in effectiveness of the location determination and sound isolation.

U.S. Pat. No. 7,415,117 shows audio source location identification and isolation. Known systems rely on stationary microphone arrays.

A position sensor is any device that permits position measurement. It can either be an absolute position sensor or a relative one. Position sensors can be linear, angular, or multi-axis. Examples of position sensors include: capacitive transducer, capacitive displacement sensor, eddy-current sensor, ultrasonic sensor, grating sensor, Hall effect sensor, inductive non-contact position sensors, laser Doppler vibrometer (optical), linear variable differential transformer (LVDT), multi-axis displacement transducer, photodiode array, piezo-electric transducer (piezo-electric), potentiometer, proximity sensor (optical), rotary encoder (angular), seismic displacement pick-up, and string potentiometer (also known as string potentiometer, string encoder, cable position transducer). Inertial position sensors are common in modern electronic devices.

A gyroscope is a device used for measurement of angular velocity. Gyroscopes are available that can measure rotational velocity in 1, 2, or 3 directions. 3-axis gyroscopes are often implemented with a 3-axis accelerometer to provide a full 6 degree-of-freedom (DoF) motion tracking system. A gyroscopic sensor is a type of inertial position sensor that senses rate of rotational acceleration and may indicate roll, pitch, and yaw.

An accelerometer is another common inertial position sensor. An accelerometer may measure proper acceleration, which is the acceleration it experiences relative to freefall and is the acceleration felt by people and objects. Accelerometers are available that can measure acceleration in one, two, or three orthogonal axes. The acceleration measurement has a variety of uses. The sensor can be implemented in a system that detects velocity, position, shock, vibration, or the acceleration of gravity to determine orientation. An accelerometer having two orthogonal sensors is capable of sensing pitch and roll. This is useful in capturing head movements. A third orthogonal sensor may be added to obtain orientation in three dimensional space. This is appropriate for the detection of pen angles, etc. The sensing capabilities of an inertial position sensor can detect changes in six degrees of spatial measurement freedom by the addition of three orthogonal gyroscopes to a three axis accelerometer.

Magnometers sometimes referred to as magnetometers are devices that measure the strength and/or direction of a magnetic field. Because magnetic fields are defined by containing both a strength and direction (vector fields), magnetometers that measure just the strength or direction are called scalar magnetometers, while those that measure both are called vector magnetometers. Today, both scalar and vector magnetometers are commonly found in consumer electronics, such as tablets and cellular devices. In most cases, magnetometers are used to obtain directional information in three dimensions by being paired with accelerometers and gyroscopes. This device is called an inertial measurement unit "IMU" or a 9-axis position sensor.

Advancements in hearing aid technology have resulted in numerous developments which have served to improve the listening experience for people with hearing impairments, but these developments have been fundamentally limited by an overriding need to minimize size and maximize invisibility of the device. Resulting limitations from miniaturized form factors include limits on battery size and life, power consumption and, thus, processing power, typically two or fewer microphones per side (left and right) and a singular focus on speech recognition and speech enhancement.

Hearing aid technology may use "beamforming" and other methods to allow for directional sound targeting to isolate and amplify just speech, wherever that speech might be located.

Hearing aid technology includes methods and apparatus to isolate and amplify speech and only speech, in a wide variety of environments, focusing on the challenge of "speech in noise" or the "cocktail party" effect (the use of directional sound targeting in combination with noise cancellation has been the primary approach to this problem).

Hearing aid applications typically ignore or minimize any sound in the ambient environment other than speech. Hearing devices may also feature artificial creation of sounds as masking to compensate for tinnitus or other unpleasant remnants of the assistive listening experience for those suffering from hearing loss.

Due to miniature form factors, hearing aids are constrained by a severe restriction on available power to preserve battery life which results in limitations in signal processing power. Applications and devices not constrained by such limitations but rather focused on providing the highest quality listening experience are able to utilize the highest quality of signal processing, which among other things, will maintain a high sampling rate, typically at least twice that of the highest frequency that can be perceived. Music CDs have a 44.1 kHz sampling rate to preserve the ability to process sound with frequencies up to about 20 kHz. Most hearing devices sample at rates significantly below 44.1 kHz, resulting in a much lower range of frequencies that can be analyzed for speech patterns and then amplified, further necessitating the use of compression and other compensating methodologies in an effort to preserve the critical elements of speech recognition and speech triggers that reside in higher frequencies.

Hearing aids have almost always required the need to compensate for loss of hearing at very high frequencies, and given equivalent volume is much higher for very high and very low frequencies (i.e., more amplification is required to achieve a similar volume in higher and lower frequencies as midrange frequencies), one strategy has been compression (wide dynamic range compression or WDRC) whereby either the higher frequency ranges are compressed to fit within a lower frequency band, or less beneficially, higher frequency ranges are literally cut and pasted into a lower band, which requires a learning curve for the user.

For these reasons hearing aid technologies do not adequately function within the higher frequency bands where a great deal of desired ambient sound exists for listeners, and hearing aids and their associated technologies have neither been developed to, nor are capable as developed, to enhance the listening experience for listeners who do not suffer from hearing loss but rather want an optimized listening experience.

SUMMARY OF THE INVENTION

An appliance may be controlled to enhance a user's audio environment and transmit audio information to a speaker system containing selected ambient audio and sourced audio. The sourced audio may be prerecorded, generated or transmitted.

In addition, the system may advantageously be used in assisted hearing applications like hearing aids or personal sound amplification ("PSAP") devices. The invention relates to an audio processing platform particularly useful for a user wearing headphones, earphones, hearables, hearing aids and/or personal sound amplification devices whereby the ambient audio may be modified to enhance listening experience and other audio may also be included. The other audio may, for example, be prerecorded music or generated audio content.

An audio analysis and processing system may have a processor configured with an audio array input thread configured to be connected to a plurality of audio input channels each corresponding to an audio input sensor. An audio input sensor may be positionally related to a position of other audio input sensors and a source input thread may be configured to be connected to a microphone audio input channel. An audio output thread may be configured to be connected to a speaker output channel and a beamformer thread may be responsive to the audio array input thread. A beam analysis and selection thread may be connected to an output of the beamformer thread and a mixer thread may have a first input connected to an output of the source input thread and a second input connected to an output of the beam analysis and selection thread and may have an output connected to the audio output thread. The audio analysis and processing system may include a communications interface connected to the processor. The communications interface may include a low-power wireless personal area network interface. The low power wireless personal area network may be a Bluetooth Low Energy (BLE) interface. The BLE interface may be a BLE daemon responsive to a user interface thread of the processor and an HCI driver responsive to the BLE daemon. A user control interface may be linked to the processor. The user control interface may be included in an application program operating on a personal communication device. The audio input channel may be connected to the personal communication device. The microphone audio input channel may be connected to the personal communication device. The processor may include a line output thread configured to connect to an audio output channel. An audio information interface may be provided to connect signals representing audio to the processor.

A beamforming apparatus may include a domain conversion stage converting a plurality of time domain signals representing audio information to a plurality of frequency domain signals representing the audio information. A bandpass filter stage may be provided with a plurality of inputs connected to the plurality of frequency domain signals and having a plurality of outputs. A beamformer filter stage may have a plurality of inputs corresponding to the plurality of outputs of the bandpass filter stage and may have a plurality of outputs. An inverse domain conversion stage may be provided to convert a plurality of inputs corresponding to outputs of the beamformer filter stage from frequency domain signals to time domain signals and may have a plurality of outputs connected to an output stage. The domain conversion stage may be a fast fourier transform stage. The fast fourier transform stage may apply a 512 point fast fourier transformation with a fifty percent (50%) overlap. The bandpass filter stage may be a 3 db filter and filters out signals other than 250 Hz to 4,200 Hz. The beamformer filter stage may be a second order differential beamformer filter. The inverse domain conversion stage may be a 512 point IFFT with fifty percent (50%) overlap. The beamforming apparatus may also include a direction of arrival unit having a plurality of inputs connected to outputs of the bandpass filter stage and a plurality of outputs and a histogram analysis stage having a plurality of inputs connected to the outputs of the direction of arrival unit and having one or more direction of arrival outputs connected to the output stage. The direction of arrival unit may perform a cross correlation at increments of 360°/250°. The histogram analysis stage may have four (4) directions of arrival outputs. An orientation generation stage may be responsive to output signals of a position sensor and may have an output connect to the output stage. The orientation generation stage may convert signals corresponding to an output of a nine-axis position sensor to signals representing roll, pitch, and yaw. A multi-signal selection unit responsive to the plurality of time domain signals and having an output connected to the output stage may be provided. The multi-signal selection unit includes noise reduction techniques.

A microphone array may include a microcontroller having a plurality of ports, a plurality of microphones connected to the ports, and a position sensor connected to a port of the microcontroller. The microcontroller may be responsive to a clock signal and the microcontroller may include a data output. The data output is a universal serial bus output. Two microphones are connected to a single port of the microcontroller. The microphones may be located on the circumference of a circle and may be equally spaced around the circumference of the circle. The microphones may be located in a known relative position to one or more other microphones of the microphone array. The microphone array may be positioned in a fixed relative position to the position sensor. The microphones may be connected to an I2S port of the microcontroller. The position sensor may be connected to the microcontroller at an I2C port. Traces connecting the microphones to the microcontroller may be substantially equal in length. The microphones may have a digital input. The microcontroller may be connected to eight microphones. The microcontroller may be configured to output 1 millisecond frames. The microcontroller may be configured to read data from the microphones and the position sensor and generate an output comprising eight audio segments each 16 bits in length and a data segment up to 32 bits in length representing at least a portion of data output from the position sensor.

An audio gateway processing method for processing a plurality of signals corresponding to directional audio beams may track the direction of arrival of a selected audio beam, rotate beam direction to match change in direction of arrival of the selected audio beam, upon voice activity detection, select a beam direction according to direction of arrival of the voice activity, and select a beam upon keyword detection where the direction of the selected beam may corresponds to the direction of arrival of detected voice activity. A beam may be selected upon voice activity detection where the direction of the selected beam corresponds to the direction of arrival of the voice activity. In addition, the process may make a determination of whether system controls are set for fixed beam processing and discarding unwanted beams. A beam may be selected upon speaker detection where a direction of the beam corresponds to a direction of arrival of detected speaker activity.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

FIG. 7 shows a beam analysis and selection process for analysis based on voice activity detection, keyword detection, and speaker profile detection.

DETAILED DESCRIPTION OF THE PREFERRED EMBODIMENT

Figure 1:
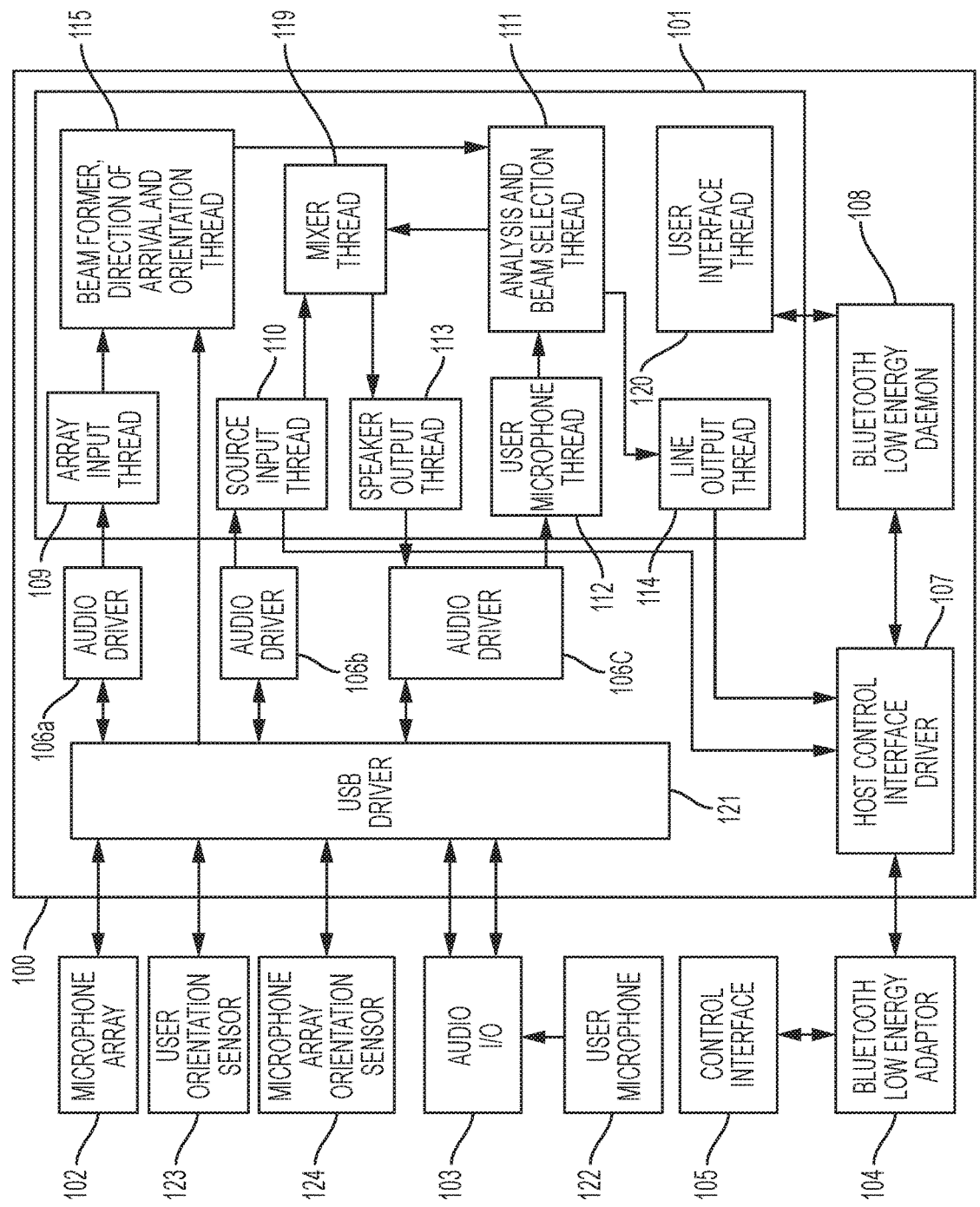
FIG. 1 shows an overview of an audio analysis and processing system platform.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention relates to a device that facilitates control over a personal audio environment. Conventional personal speakers (headphones and earphones) provide a barrier between the ambient audio environment and the audio that a user is exposed to. The isolating effect of personal speakers is disruptive and may be dangerous. Conventional personal speakers often must be removed by a user in order to hear ambient audio. The isolating effect of personal speakers is widely recognized. Some states have enacted laws prohibiting personal speakers from being worn while driving. The organizers of many sporting events, like running and bicycle races have prohibited competitors from using personal speakers in completion because the audio isolation can be dangerous.

Noise-canceling headphones increase a user's audio isolation from the environment. This brute force approach to noise reduction is not ideal and comes at the expense of blocking ambient audio that may be desirable for a user to hear. A user's audio experience may be enhanced by selectively controlling the ambient audio delivered to a user.

The system described herein allows a user to control an audio environment by selectively admitting portions of ambient audio. The system may include personal speakers, a user interface, and an audio processing platform. A microphone array including audio sensing microphones may be utilized to detect the acoustic energy in the environment. A beamforming unit may segment the audio environment into distinct zones. The zones may be overlapping. An audio gateway can determine the zone or zones which include desirable audio and transmit signals representing audio from one or more of those zones to a personal speaker system. The gateway can be controlled in one or more modes through a user interface. The user interface may be implemented with a touchscreen on a personal communications device running an application program.

The gateway may include a mixer to blend one or more audio zones with electronic source audio signals. The electronic source audio may be a personal music player; a dedicated microphone; or broadcast audio information.

The gateway may be in a fixed arc and/or fixed direction mode. In such modes, beamforming techniques may admit audio from a direction or range of directions. This may be done independent of the presence of audio originating from the direction or range of directions.

Another mode of operation may rely on keyword spotting. When a keyword spotting algorithm detects a keyword, the system selects the beam in which the keyword was detected, for transmission to the personal speaker. The system may use constrained or unconstrained keyword spotting. Keyword spotting may use a sliding window and garbage model, a k-best hypotheses, iterative Viterbi decoding, dynamic time warping, or other methods for keyword spotting. In addition, keyword spotting may include phrases consisting of multiple words. See https://en.wikipedia.org/wiki/keyword_spotting.

Another mode of operation may rely on speaker recognition. When an algorithm detects the presence of speech along with sufficient acoustical detail to match the audio or speech with a locally stored or available profile, the system may select the beam in which the audio exhibits characteristics sufficiently closer to the profile that was detected. The profile may relate to a speaker of interest.

Voice activity detection (VAD), also known as speech activity detection or speech detection is a technique used in speech processing in which the presence or absence of human speech is detected. Various VAD algorithms may be used that provide varying features and compromises between latency, sensitivity, accuracy and computational cost. Some VAD algorithms also provide further analysis, for example whether the speech is voiced, unvoiced or sustained.

The VAD algorithm may include a noise reduction stage, e.g. via spectral subtraction. Then some features or quantities may be calculated from a section of the input signal. A classification rule may be applied to classify the section as speech or non-speech—often this classification rule finds when a value exceeds a threshold.

There may be some feedback in this sequence, in which the VAD decision is used to improve the noise estimate in the noise reduction stage, or to adaptively vary the threshold(s). These feedback operations improve the VAD performance in non-stationary noise (i.e. when the noise varies a lot).

According to published VAD methods formulates the decision rule on a frame by frame basis using instantaneous measures of the divergence distance between speech and noise. See Ramírez J, Segura J C, Benítez C, de La Torre A, Rubio A: A new voice activity detector using subband order-statistics filters for robust speech recognition. *Proceedings of IEEE International Conference on Acoustics, Speech and Signal Processing* (ICASSP '04), 2004 1: 1849-1852. Different measures which may be used in the VAD including spectral slope, correlation coefficients, log likelihood ratio, cepstral, weighted cepstral, and modified distance measures.

Voice activity detection may be configured to allow audio information from the zone corresponding to the direction of origin of the voice activity.

Another mode of operation may be a speaker recognition mode. Speaker recognition is the identification of a person from characteristics of voices (voice biometrics). It is also called voice recognition. There is a difference between speaker recognition (recognizing who is speaking) and speech recognition (recognizing what is being said). These two terms are frequently confused. Recognizing the speaker can simplify the task of allowing a user to hear a speaker in a system that has been trained on a specific person's voice.

Speaker recognition uses the acoustic features of speech that have been found to differ between individuals. These acoustic patterns reflect both anatomy (e.g., size and shape of the throat and mouth) and learned behavioral patterns (e.g., voice pitch, speaking style).

Each speaker recognition system may have two phases: Enrollment and verification. During enrollment, the speaker's voice may be recorded and/or modeled on one or more features of the speaker's voice which are extracted to form a voice print, template, or model. In the verification phase, a speech sample or "utterance" may be compared against a previously created voice print. The utterance may be compared against multiple voice prints in order to determine the best match having an acceptable score. Acoustics and speech analysis techniques may be used.

Speaker recognition is a pattern recognition problem. Various techniques may be used to process and store voice prints including frequency estimation, hidden Markov models, Gaussian mixture models, pattern matching algorithms, neural networks, matrix representation, Vector Quantization and decision trees. The system may also use "anti-speaker" techniques, such as cohort models, and world models. Spectral features are predominantly used in representing speaker characteristics.

Ambient noise levels can impede both collections of the initial and subsequent voice samples. Noise reduction algorithms may be employed to improve accuracy.

FIG. 1 shows an overview of an audio analysis and processing system. The audio analysis and processing system may have a base 100 connected to peripheral components. Various configurations are possible where one or more peripherals are integrated with the base 100 or are connected by wires or wirelessly. The system may have a main processor 101. The main processor may be implemented as a multi-core, multi-threaded processor and/or may be multiple processors. The audio analysis and processing system may include a microphone array 102. The microphone array 102 may be connected to provide captured audio. The captured audio may be processed to provide directional audio and position information.

Figure 2:
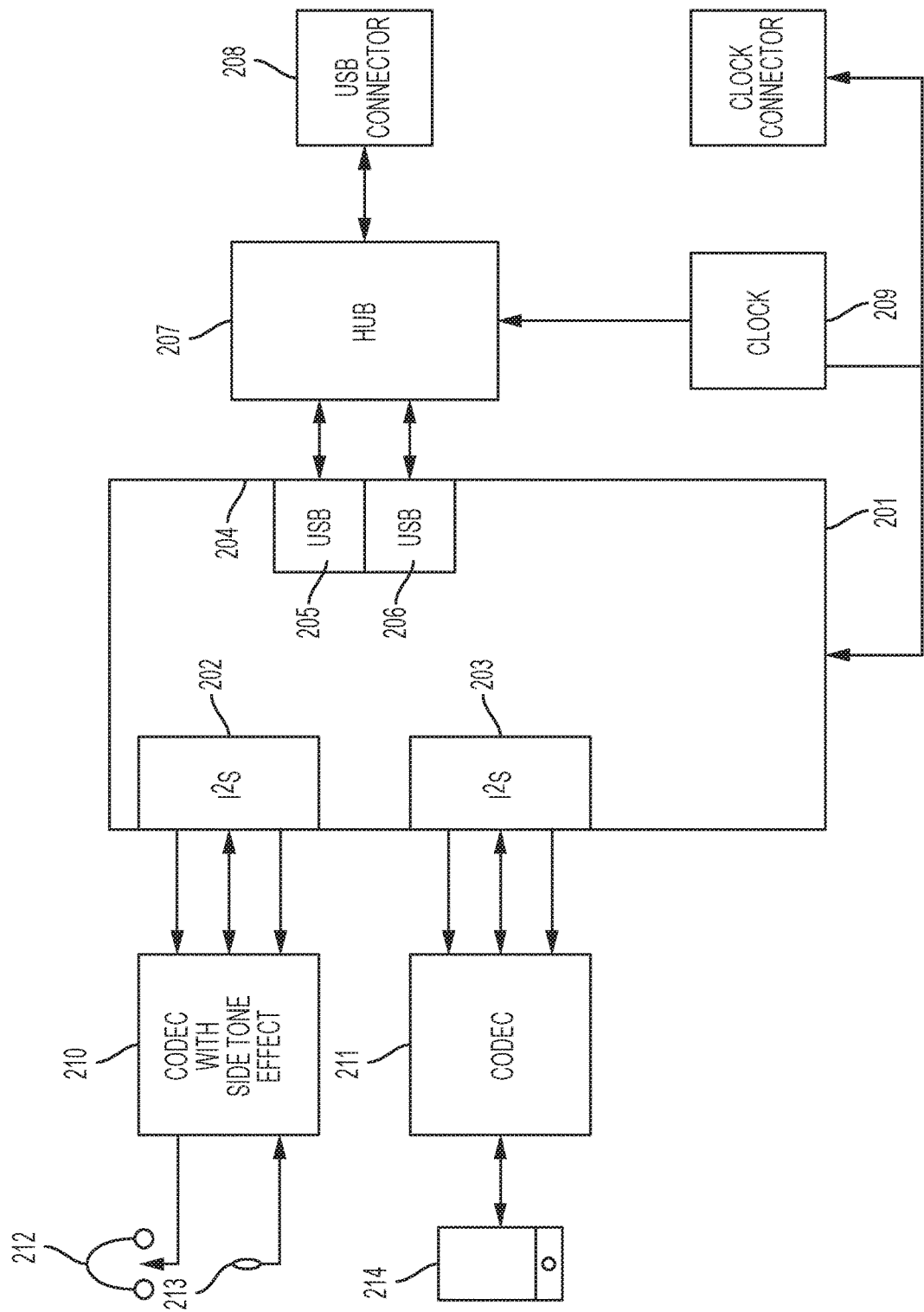
FIG. 2 shows an audio input output subsystem.

The audio analysis and processing system may include an audio input output ("I/O") subsystem 103 described further in FIG. 2. The audio input output subsystem 103 may be provided to process audio output, audio input from a user microphone 122, audio input from a personal communication device, and output of audio to a personal communication device.

The audio analysis and processing system may include a Bluetooth low energy ("BLE") adapter 104 and the control interface 105. The BLE adapter 104 may be provided to set up communications with a control interface 105 which may operate on a personal communication device, such as an iOS or Android-based cellphone, tablet, or other device. The control interface may be implemented as an app. The microphone array 102 and audio I/O subsystem 103 may be connected to a USB driver 121, which in turn may be connected to audio drivers 106a, 106b, and 106c. The microphone array 102 may be provided with one audio driver 106a for use in connection with the microphone array 102. An audio driver 106b may be dedicated to the input communications from the audio I/O subsystem 103, and a third driver 106c may be dedicated for use in connection with the output functions of the audio I/O subsystem 103. A Host Control Interface ("HCI") driver 107 may be connected to interface with the BLE adapter 104. A BLE daemon 108 may be provided for communications with the HCI driver 107. The components 105-107 may be conventional components implemented using a Linux operating system environment.

The main processor may run a plurality of processes or software threads. A software thread is a process that is part of a larger process or program. An array input thread may be an audio input thread 109 which may be connected through a USB driver 121 and audio driver 106a to the microphone array 102. The audio input thread 109 may serve to unpack a data transmission from the microphone array 102. The unpacked data may be provided to a pre-analysis processing thread shown as the beamformer, direction of arrival, and orientation thread 115 in order to implement a beamformer, direction of arrival process, and an orientation thread to process the input signals in order to arrive at usable direction, orientation, and separated audio source signals. The beamformer 115 may take signals representing audio from a plurality of microphones in the microphone array 102. For example, eight (8) signals representing audio detected at eight microphones. The beamformer 115 may process the signals to generate a plurality of directional beams. The beams, for example, may originate at the array and may have overlapping zones, each with 50% intensity over a 360 degree range, or may be a non-spatialized representation of the microphone array signals.

A source input thread 110 may be responsive to the control interface 105 and is provided to process audio signals from the audio I/O subsystem 103 through the USB driver 121 and audio driver 106 in order to extract audio input based on audio obtained through the audio I/O system 103. The source input thread 110 may provide audio to the mixer thread 119. The source input thread 110 may be implemented with the ALSA (Advanced Linux Sound Architecture Library) kernel and library APIs to initialize the source input hardware and capture gain of the source input audio. In part this is done using the snd_pcm_open( ) and snd_ctl_open( ) ALSA functions. Then the ALSA snd_pcm_readi( ) function may be called to request additional samples when its buffer is not full. When a complete buffer is available, it may be en-queued and a buffer available signal may be sent to the mixer thread 119.

A user microphone input thread 112 is provided to process audio from a personal microphone 213 associated with personal speakers 212 (FIG. 2) and provides an input of signals representing audio to an analysis and beam selection thread 111. The user microphone thread algorithm may use the ALSA (Advanced Linux Sound Architecture Library) kernel and library APIs. The user microphone input hardware and capture gain of the user microphone may be initialized. This may be done using the snd_pcm_open( ) and snd_ctl_open( ) ALSA functions. Then the user microphone thread algorithm may use the ALSA snd_pcm_readi( ) function to request additional samples when its buffer is not full. When a complete buffer is available, it may be en-queued and a buffer available signal may be sent to the mixer thread. A speaker output thread 113 may be provided to pass signals representing audio from a mixer thread 119 through an audio driver 106c and USB driver 121 to an audio I/O subsystem 103. The speaker output thread 113 may use the ALSA (Advanced Linux Sound Architecture Library) kernel and library APIs to initialize the audio output hardware and gain. This may be done using the snd_pcm_open( ) and snd_ctl_open( ) ALSA functions. When it receives a new buffer of audio output samples, it may use the ALSA snd_pcm_writei( ) function to send those samples to the output driver.

Line output thread 114 may be controlled through the BLE daemon 108 controlled by the control interface 104. The line output thread 114 may receive a signal representing audio from the analysis and beam selection thread 111 and passes audio information through to the host control interface driver 107 to the control interface 104. The line output thread algorithm may use the ALSA (Advanced Linux Sound Architecture Library) kernel and library APIs to initialize the audio output. This may be done using the snd_pcm_open( ) and snd_ctl_open( ) ALSA functions. When it receives a new buffer of audio output samples, it may use the ALSA snd_pcm_writei( ) function to send those samples to the Host Interface driver.

Figure 6:
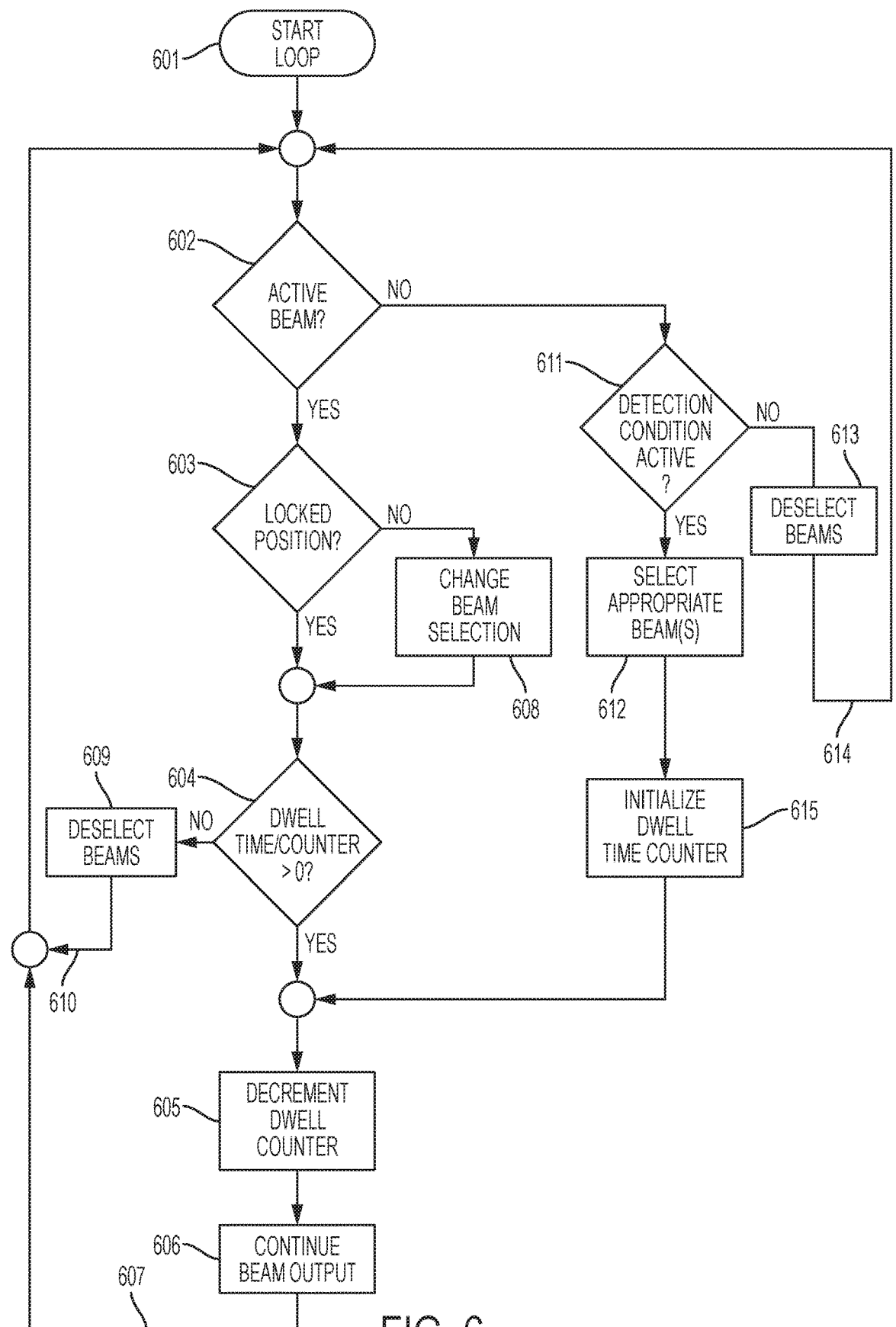
FIG. 6 shows a process for audio analysis and beam selection

An analysis and beam selection thread 111 may be provided for specialized processing of the input audio beams. For example, the analysis and beam selection thread 111 may be capable of receiving multiple beams from beamformer, direction of arrival, orientation thread 115 and processing one or more audio beams through a series of analysis threads. Examples of analysis threads are shown in FIGS. 6 and 7. The analysis may be, for example, a speaker recognition thread, a keyword analysis thread, and/or a speaker identification or a keyword identification thread.

When the analysis and beam selection thread 111 identifies a condition in the analysis threads, the audio may be provided to a mixer thread 119 which processes the audio signal for transmission back through the audio I/O subsystem 103 to a personal speaker 212 (FIG. 2) for the user.

In order to track relative position of a user, the microphone array position sensor 123 and a microphone array position sensor 124 may provide input to the beamformer, direction of arrival and orientation thread 115. The position sensors may include one or more of a magnetometer, accelerometer, and a gyrometer. In a special case where the microphone array 102 is in a fixed orientation relative to a user, only one position sensor may be needed. U.S. patent application Ser. No. 15/355,766, now U.S. Pat. No. 9,980, 075, the disclosure of which is expressly incorporated herein by reference, describes the apparatus and process for stabilizing audio output to compensate for changes in position of a user, a microphone array and an audio source.

The main processor 101 may also include a user interface thread 120 which permits the control interface 104 to control the processing performed by the main processor 101.

FIG. 2 shows an audio input output subsystem 103 in greater detail. The audio input output subsystem 103 may have a microcontroller 201 that serves as the primary switch. The microcontroller 201 may, for example, be implemented by an STM-32F746 microcontroller. The microcontroller 201 may include I²S serial ports 202 and 203. The port 202 may be connected to a codec 210 having a side tone loop for connection to personal speakers 212 and a personal microphone 213. The microcontroller I²S port 203 may be connected through a codec 211 to a personal communication device 214. The personal communication device 214 may be an Android or iOS-based system such as a cellphone, tablet or other dedicated controller.

The microcontroller 201 may also include a USB interface 204. The USB interface 204 may be implemented as a standard USB, a single high-speed USB, or as a dual-standard USB having USB interfaces 205 and 206. In the implementation with dual USB interfaces, they may be connected to a USB hub 207 and then to a USB connector 208 and operate at 480 mbps. The audio analysis system may also include a system clock 209. The system clock may reside on the audio input output subsystem 103. The system clock 209 may be located on or be connected to a system clock 209. The system clock 209 may be also connected as the clock in the microphone array/audio position capture system.

Figure 3:
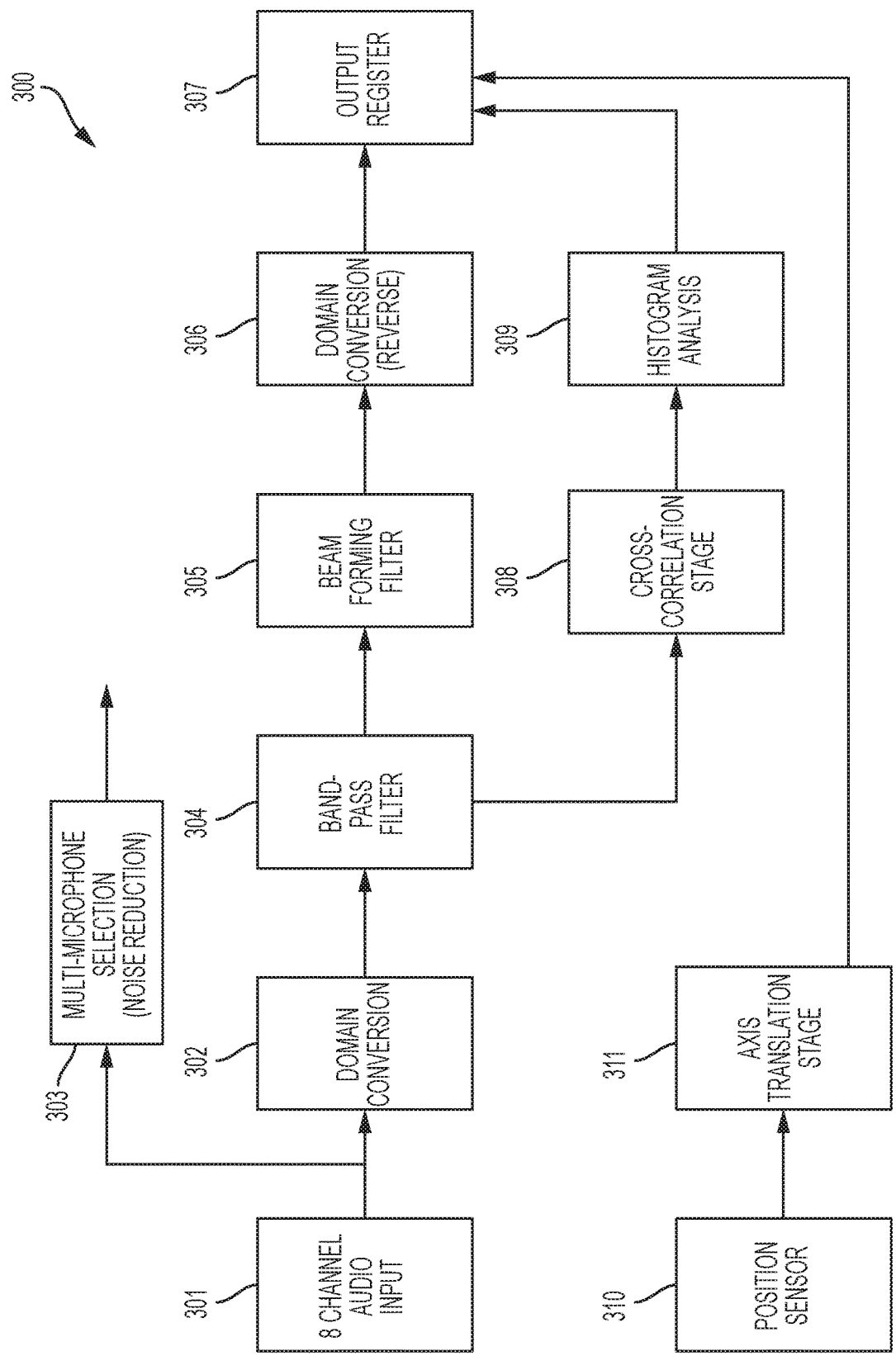
FIG. 3 shows a directional processing system for beamforming direction of arrival and orientation processing for an 8-channel microphone array.

FIG. 3 shows a directional processing system 300 for beamforming, direction of arrival, and orientation processing for an 8-channel microphone array. The directional processing system 300 may have an 8-channel input 301. Advantageously the eight (8) channel input 301 may be simultaneously sampled at 16 kHz and be provided in 16 millisecond frames. Each of the channels may be connected to a domain conversion unit 302. The domain conversion may convert sampled signals in the time domain to frequency domain representations. Each of the eight microphone channels may undergo a 512 point Fast Fourier Transform ("FFT") with 50% overlap. The output of domain conversion 302 may be processed through band-pass filter 304. The band-pass filter 304 may be an 8-channel band-pass filter which may have a passband of 250 Hz to 4200 Hz. Two or more of the audio input channels may be connected to a multi-microphone selection unit 303. The output of the multi-microphone selection unit may be a single channel output. Optionally, the combination may be performed with added noise reduction processing. An example of multi-microphone selection with noise reduction is shown in R. Zelinski, "A microphone array with adaptive post-filtering for noise reduction in reverberant rooms," *Proc. Int. Conf. Acoust., Speech, Signal Proces.*, 1988, pp. 2578-2581.

The output of the band-pass filter 304 may be connected to a beamforming filter 305. The beamforming filter may be an 8-channel second order differential beamformer. The output of beamforming filter 305 may be frequency domain outputs. The frequency domain outputs of beamforming filter 305 may be connected to domain conversion stage 306. The domain conversion stage 306 may apply a 512 point Inverse Fast Fourier Transform ("IFFT") with 50% overlap to convert the frequency domain outputs of the beamforming filter 305 to time domain signals. The time domain output of the domain conversion stage 306 may be eight channels connected to an output register 307. The output register 307 may have eight (8) audio channels at 16 kHz. Each of the eight (8) audio channel outputs may provide a directional output having a central lobe separated by approximately 45°. The directional processing system 300 may include a cross-correlation stage 308 connected to an output of the band-pass filter 304 and may apply a cross correlation having 360°/255° directional steps. The output of the cross-correlation stage 308 may be connected to a histogram analysis stage 309 which advantageously identifies direction of arrival of the most dominant directional steps. Advantageously the four (4) most dominant steps as determined by the histogram analysis may be mapped onto 1-4 of the 8-channel directional outputs of the output register 307. The output register 307 may include a representation of which one or more of the 8 channels correspond to the most dominant steps.

A position sensor 310 may provide output data to an axis translation stage. The position sensor 310 may be a 9-axis sensor which generates output data representing a gyroscope device in 3 axes; an accelerometer in 3 axes; and a magnometer in 3 axes. The sensor may be fixed to the microphone array. The axis translation stage 311 may convert the position sensor data to data representing roll, yaw, and pitch. The position sensor data may be provided in a 16 millisecond period. The output of the axis translation stage 311 may be connected to the output register 307 which may include a representation of the orientation.

Figure 4:
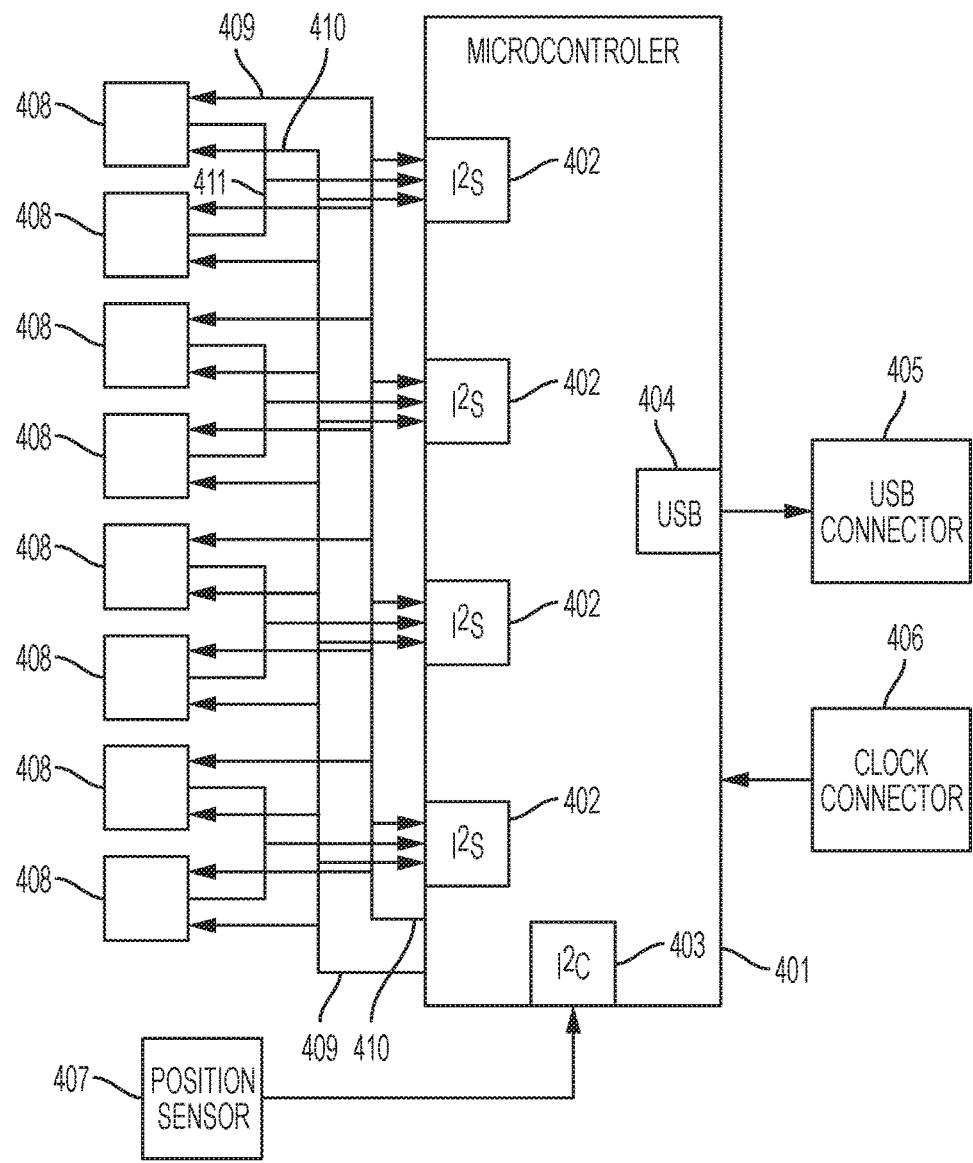
FIG. 4 shows a synchronous sensor array.

FIG. 4 shows a synchronous sensor array. The synchronous sensor array may be a microphone array for use in a system that generates signals representing audio substantially isolated to a direction of arrival. The direction of arrival may be a range of direction obtained through a beamforming process. The sensor array may include a microcontroller 401. The microcontroller 401 may, for example, be an STM32F411. The microcontroller 401 may include a plurality of serial ports 402 connected to sensors 408. As noted, the sensors 408 may be microphones. The serial ports may be I²S ports. The microcontroller 401 may also have a serial port 403 connected to a position sensor 407. The position sensor 407 may be a 9-axis position sensor including an output of 16 bits×3 for acceleration, gyroscope, and magnometer. Advantageously the sensors 408 may be microphones that include integrated analog-to-digital conversion and serialization and may be, for example, Invensys 93, ICS43432 model. The position sensor may, for example, be provided by Invensense MotionTracking Device Gyroscope and Accelerometer and Magnetometer Model No. MPU9250. The microcontroller 401 also may include a USB port 404 connected to a USB connector 405. The USB communication may operate at 12 MB per second.

A system clock 209 may be connected to connector 406. The same clock used for the audio input and output may be used to facilitate synchronous data handling. The microcontroller 401 may operate to output simultaneous signals 409 to the sensors 408. It may be advantageous to equalize the trace, 409, lengths to each sensor 408. The equalized trace lengths facilitate the near-simultaneous capture from all microphones. The microphones 408 may each be connected by serial ports 402 to the microcontroller 401. The sensors 408 may be connected in pairs to the microcontroller 401 to serial ports 402. The serial ports 402 may be I²S ports. A position sensor 407 associated with sensors 408 may be connected to the serial port 403 of the microcontroller 401. The microcontroller 401 may have a strobe/enable line 410 connected to the sensors 408. The microcontroller 401 collects data from the sensors 408 over data lines 411. The data is packaged into frames 501 shown in FIG. 5 and transmitted through the USB interface 404. The data is output to USB connector 405 which may be connected to the USB driver 121 shown in FIG. 1.

The microcontroller 401 is configured to collect synchronous data from the sensors 408 of a sensor array. The microcontroller may package the data into frames acting as a multiplexer.

The sensors 408 may be arranged in fixed relationship to the position sensor 407. The microphones 408 may have a known relative position, and may advantageously be arranged in a "circular" pattern.

Figure 5:
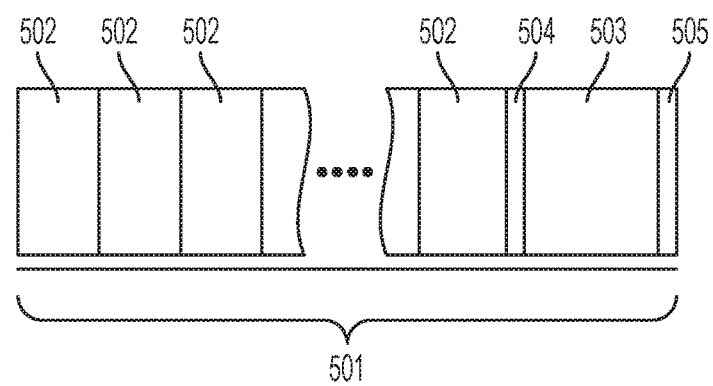
FIG. 5 shows the data output format of a synchronous sensor array.

The microcontroller 401 may be configured as a multiplexer in order to read-in and consolidate the data into the format shown in FIG. 5. The microcontroller 401 may be programmed to specify the input formats and ranges, the frequency of capture, and the translation between input and USB output 404.

FIG. 5 shows the data output format of the microcontroller 401. The data output frame 501 may include eight (8) 16-bit segments representing audio sampled at 1600 kHz by the sensors 408. The signals representing sampled audio is sequenced in segments 502 of the frame 501. A data segment 503 may be placed in the frame 501 after the eighth audio segment 502. The data segment 503 may be delimited by a "start of frame" signal 504 and an "end of frame" signal 505. The data segment 503 may be 32 bits and carry position sensor 407 data. The position measurements do not require the same frequency as the audio capture. As such the 3×16-bit output of the position sensor 407 may be spread across multiple data output frames 501 in the position sensor data section 503. For example, two 16-bit channels may be included in a first data frame 501 and the third 16-bit channel may be included in a subsequent data output frame. Alternatively, each frame 501 may include a single position sensor channel and may include a flag indicating which channel is included in each particular data frame 501.

FIG. 6 shows a process for audio analysis and beam selection. The process may be a continuous loop or thread while the system is in operation. Generally the beamformer may separate the 360 degree audio detection field into segments. The central line of each segment may be spaced equally along a radial plane. The beamformer may establish eight (8) equal segments having central lines spaced by 45 degrees. Each segment may be referred to as a beam and audio originating from within such segment may be referred to as a beam whether or not active beamforming is being performed by the system. The beams may be adjacent or somewhat overlapping. For simplicity, non-beamformed audio signals are in use when beamforming is not active.

The loop start point is designated 601. Decision 602 determines whether there is any active beam. If the response to 602 is yes, decision 603 determines if the beam position is locked. The beam position may be locked by a user command or operation or may be locked pursuant to condition analysis (not shown). If the determination at decision 603, decision 604 determines if the dwell time counter is greater than zero (0). The dwell time represents the period of time a beam is active. The period of time may be set according to a user command or be a fixed time period. The fixed time period may be set for a duration suitable for the application.

If the dwell time counter is greater than zero, the step 605 decreases the dwell time counter. Step 606 represents allowing the beam output to continue. The process at 607 returns to start loop 601.

If the determination 602 is that there is no active beam, determination 611 tests whether the detection condition is active. The detection condition is any condition that the analysis process is monitoring. Audio conditions may include voice activity detection, keyword detection, speaker detection, and direction of arrival detection. Other conditions may also be monitored, both audio and non-audio. For example, location services may provide input to the condition detection noise profiles, audio profiles, such as an alarm detection, proximity detection, detection of beacon signals, like iBeacon, detection of ultrasonic signals, matching audio content to a reference, or other audio or non-audio sensed conditions.

If a detection condition is active. Step 602 is to select the appropriate beam or beams. The selection may choose a beam or beams correlating to the beam carrying the strongest portion of an active detection condition. The dwell time counter may be initialized at step 615. Step 615 may be performed after the detection condition active decision 611 or after the select appropriate beam step 612.

The next step may be to decrement the dwell counter at 605 or to continue the beam output 606.

If a beam is locked to a particular direction, the system will continuously ensure that such direction and orientation is known, such that any subsequent change of the user and/or microphone array orientation can result in an offsetting adjustment to such beam in order to preserve its originally identified direction and orientation.

If decision 603 determines that the beam position is not locked, then step 608 may operate to change the beam selection. The beam selection is changed to correspond to the direction from which a sound matching the user's established selection criteria is emanating.

If step 604 determines that the dwell time counter is not greater than zero, all beams are deselected at step 609. The deselection step includes changing the beam status to inactive. After 609, start loop 610 takes the process flow to start loop 601.

If the detection condition active decision 611 is no, then the process goes to deselect beams at 613, which may be the same as deselect step 609, and start loop 614 passes back to start loop 601.

FIG. 7 shows a beam analysis and selection process for analysis based on voice activity detection, keyword detection, and speaker profile detection. The beam analysis and selection process may be a gateway utilized in order to process multiple input beams for channel selection. According to an embodiment shown in FIG. 7, signals representing eight (8) beams, a signal representing direction of arrival and a signal representing orientation may be provided at 701. The system determines whether a fixed arc position has been specified at 702, and if so, unwanted beams are discarded at 703. A fixed arc setting is a setting which may be established at a user interface to permit directional pointing and/or beam width in a specified direction. A decision is performed at 704 to determine if there is a beam selected and there is remaining dwell time. If so, the systems may say determination of whether the beam is fixed and not locked at decision 705. If so, the beam is selected and the dwell time is incremented at 725. If decision 705 is negative on fixed and not locked, a decision 706 is made whether the azimuth (or orientation) has changed. If so, the beam is rotated at 707 and then the beam is selected and dwell time incremented at 725. Beam rotation may be a process for selecting a beam or modifying the beamforming process rather than any physical rotation. Modification of the beamforming process may be [accomplished] by altering the signal weights. If decision 706 is negative, then the beam is also selected and dwell time incremented at 725.

If decision 704 determines that the beam is selected and "dwell time not over" is a negative, then the system will determine voice activity at 708. Decision 709 is a decision on whether voice activity detection is configured (or turned on). If so, decision 710 determines whether there is voice activity. This may be done for each of the eight beams. If decision 710 determines there is voice activity, then step 711 will set a timer to start dwell time for voice activity. If voice activity is not configured at decision 709 or detected at decision 710, or after starting dwell time, the process performs a keyword configuration at decision 712. This may be done for each of the eight beams. If yes, keyword processing occurs at step 713 and then a keyword detection decision is made at 714. If the keyword detection decision is yes, step 715 starts dwell time and deconfigures keyword detection. After step 715, after no keyword detected at decision 714 and after no keyword configuration at decision 712, the process proceeds to a speaker configuration decision at 716.

Decision 716 determines if the speaker profile detection is activated. If activated, the system carries out speaker processing at 717. After the speaker processing, decision 718 determines the speaker has been detected. This may be done by matching a reference voice profile to a profile generated from a beam. The speaker profile advantageously may be a preconfigured speaker profile. If the speaker profile is matched at decision 718 is yes, the system may start dwell time and deconfigure speaker detection at 719. After deconfiguration of speaker detection at 719, after a decision 716 that speaker configuration is off, and after a decision 718 that speaker profile detection is off, the process is passed to direction of arrival processing 720.

Decision 720 determines whether direction of arrival processing is configured. If yes, direction processing is performed at 721. After direction processing is performed at 721, a decision 722 is made to check the decision or the direction of arrival at 722.

The decisions 710, 714, 718, and 722 are stored for use at decision 723 where the detected criteria is checked against the configured criteria. If the detected criteria matches the configured criteria, then the beam with the most power is selected at step 724. If the detected criteria does not match any configured criteria, then step 726 deselects all beams. After the selection at 724, the dwell time is incremented at step 725. Processing then returns to step 701 for the next 16-millisecond interval. The process may be continuously repeated on a 16-millisecond cycle.

The user may select the overall volume of the system and may select the relative volume of the prerecorded content against the injected. The system may be configured to maintain the same overall output level regardless of whether there is injected audio being mixed with prerecorded content or prerecorded content alone.

Alternative audio processing may include a sound level monitor so that the actual levels of injected sound are determined and the overall volume and/or relative volumes are adjusted in order to maintain a consistent output sound level and/or ratio.

The mixer may also inject audio signals indicative of detection of configured audio variables.

The techniques, processes and apparatus described may be utilized to control operation of any device and conserve use of resources based on conditions detected or applicable to the device.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of an audio analysis and processing system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An audio analysis and processing system comprising:
a processor configured with:
an audio array input thread configured to be connected to a plurality of audio input channels each corresponding to an audio input sensor;
an audio input sensor positionally related to a position of other audio input sensors;
a source input thread configured to be connected to a microphone audio input channel;
an audio output thread configured to be connected to a speaker output channel;
a beamformer thread responsive to said audio array input thread;
a dwell time counter responsive to said beamformer thread;
a beam analysis and selection thread connected to an output of said beamformer thread and responsive to said dwell time counter; and
a mixer thread having a first input connected to an output of said source input thread and a second input connected to an output of said beam analysis and selection thread and having an output connected to said audio output thread.

2. The audio analysis and processing system according to claim 1 further comprising a communications interface connected to said processor.

3. The audio analysis and processing system according to claim 2 wherein said communications interface further comprises a low-power wireless personal area network interface.

4. The audio analysis and processing system according to claim 3 wherein said low power wireless personal area network is a Bluetooth Low Energy (BLE) interface.

5. The audio analysis and processing system according to claim 4 wherein said BLE interface further comprises a BLE daemon responsive to a user interface thread of said processor and an HCI driver responsive to said BLE daemon.

6. The audio analysis and processing system according to claim 2 further comprising a user control interface linked to said processor.

7. The audio analysis and processing system according to claim 6 wherein said user control interface further comprises an application program operating on a personal communication device.

8. The audio analysis and processing system according to claim 7 wherein said audio input channel is connected to said personal communication device.

9. The audio analysis and processing system according to claim 8 wherein said microphone audio input channel is connected to said personal communication device.

10. The audio analysis and processing system according to claim 1 wherein said processor further comprises a line output thread configured to connect to an audio output channel.

11. The audio analysis and processing system according to claim 2 further comprising an audio information interface connecting signals representing audio to said processor.

12. The audio analysis and processing system according to claim 1 further comprising a host control interface driver connected to said source input thread.

* * * * *